(12) United States Patent
Linke

(10) Patent No.: US 8,188,414 B2
(45) Date of Patent: May 29, 2012

(54) GRID SUPPORT SYSTEM FOR A TRACKER-MOUNTED SOLAR PANEL ARRAY FOR ROOFTOP APPLICATIONS

(75) Inventor: Edward J. Linke, Milford, CT (US)

(73) Assignee: Opel, Inc., Shelton, CT (US)

( * ) Notice: Subject to any disclaimer, the term of this patent is extended or adjusted under 35 U.S.C. 154(b) by 350 days.

(21) Appl. No.: 12/342,520

(22) Filed: Dec. 23, 2008

(65) Prior Publication Data

US 2010/0154780 A1   Jun. 24, 2010

(51) Int. Cl.
*G01C 21/02* (2006.01)
*F24J 2/46* (2006.01)

(52) U.S. Cl. ..................................... 250/203.4; 126/623

(58) Field of Classification Search ............... 250/203.4; 126/569, 571, 573, 623, 696; 136/243–246
See application file for complete search history.

(56) References Cited

U.S. PATENT DOCUMENTS

| | | |
|---|---|---|
| 4,256,088 A | 3/1981 | Vindum |
| 4,860,509 A | 8/1989 | Laaly et al. |
| 4,860,581 A | 8/1989 | Zimmerman et al. |
| 4,886,554 A | 12/1989 | Woodring et al. |
| 4,930,493 A | 6/1990 | Sallis |
| 5,022,929 A | 6/1991 | Gallois-Montbrun |
| 5,316,592 A | 5/1994 | Dinwoodie |
| 5,445,177 A | 8/1995 | Laing et al. |
| 5,746,839 A | 5/1998 | Dinwoodie |
| 6,046,399 A | 4/2000 | Kapner |
| 6,606,823 B1 | 8/2003 | McDonough et al. |
| 6,959,993 B2 | 11/2005 | Gross et al. |
| 6,968,654 B2 | 11/2005 | Moulder et al. |
| RE38,988 E | 2/2006 | Dinwoodie |
| 7,196,621 B2 | 3/2007 | Kochis |
| 7,197,180 B2 | 3/2007 | Farmer |
| 7,240,674 B2 | 7/2007 | Patterson |
| 7,381,886 B1 | 6/2008 | Aiken et al. |
| 7,388,146 B2 | 6/2008 | Fraas et al. |
| 7,435,134 B2 | 10/2008 | Lenox |

(Continued)

FOREIGN PATENT DOCUMENTS

EP          1106938          6/2001

(Continued)

OTHER PUBLICATIONS

Bowdoin Geneva Community Center, Feasibility Study of Photovoltaic Energy Options, HMFH Architects, Cambridge, MA and Solar Design Associates, Inc., Harvard, MA, Jan. 12, 2006.

*Primary Examiner* — Thanh X Luu
(74) *Attorney, Agent, or Firm* — Gordon & Jacobson, PC

(57) ABSTRACT

A grid support system for tracker-mounted solar panel array for rooftop applications includes a base frame having a plurality of interconnected lateral members which define a generally planar area substantially parallel with the rooftop. The system also includes a set of support legs corresponding to each one of the tracker devices. The set of support legs are secured to the lateral members and extend upward and inward toward one another to a respective tracker mounting plate. The tracker mounting plate supports a tracker device and associated solar panel(s). A plurality of ballast trays are secured to the base frame and are adapted to hold a plurality of ballast weights for applying a downward force on the base frame to stabilize and resist movement of the base frame.

24 Claims, 7 Drawing Sheets

U.S. PATENT DOCUMENTS

| | | |
|---|---|---|
| 7,435,897 B2 | 10/2008 | Russell |
| 2003/0070705 A1 | 4/2003 | Hayden et al. |
| 2004/0128923 A1 | 7/2004 | Moulder et al. |
| 2005/0072456 A1 | 4/2005 | Stevenson et al. |
| 2005/0072458 A1 | 4/2005 | Goldstein |
| 2005/0133082 A1 | 6/2005 | Konold et al. |
| 2005/0166955 A1* | 8/2005 | Nath et al. .................. 136/251 |
| 2005/0217665 A1 | 10/2005 | Luconi |
| 2005/0229924 A1 | 10/2005 | Luconi et al. |
| 2006/0054162 A1 | 3/2006 | Romeo |
| 2006/0225781 A1 | 10/2006 | Locher |
| 2007/0012311 A1 | 1/2007 | Yi et al. |
| 2007/0051401 A1 | 3/2007 | Aaron |
| 2007/0193620 A1 | 8/2007 | Hines et al. |
| 2007/0215199 A1* | 9/2007 | Dold et al. .................. 136/246 |
| 2007/0227573 A1 | 10/2007 | Hunter et al. |
| 2007/0227574 A1 | 10/2007 | Cart |
| 2007/0227581 A1 | 10/2007 | Chen et al. |
| 2007/0246039 A1 | 10/2007 | Brazier et al. |
| 2007/0272234 A1 | 11/2007 | Allen et al. |
| 2007/0272826 A1 | 11/2007 | Huang et al. |
| 2008/0029144 A1 | 2/2008 | Brazier et al. |
| 2008/0036440 A1 | 2/2008 | Garmer |
| 2008/0066735 A1 | 3/2008 | Yeh et al. |
| 2008/0066801 A1 | 3/2008 | Schwarze |
| 2008/0127964 A1 | 6/2008 | Han |
| 2008/0178867 A1 | 7/2008 | DiDomenico |
| 2008/0190476 A1 | 8/2008 | Baruh |
| 2008/0196410 A1 | 8/2008 | Primlani |
| 2008/0216823 A1 | 9/2008 | Kmetovicz et al. |
| 2008/0230047 A1 | 9/2008 | Shugar et al. |
| 2008/0245360 A1 | 10/2008 | Almy et al. |
| 2008/0245402 A1 | 10/2008 | Romeo |

FOREIGN PATENT DOCUMENTS

| | | |
|---|---|---|
| EP | 1306907 | 5/2003 |
| EP | 0892877 | 7/2006 |
| EP | 1860386 | 11/2007 |
| EP | 1901012 | 3/2008 |
| FR | 2535033 | 4/1984 |
| WO | WO97/38185 | 10/1997 |
| WO | WO2004/020762 | 3/2004 |
| WO | WO2004/044502 | 5/2004 |
| WO | WO2005/060681 | 7/2005 |
| WO | WO2006/020597 | 2/2006 |
| WO | WO2007/038760 | 4/2007 |
| WO | WO2007/108976 | 9/2007 |
| WO | WO2008/024177 | 2/2008 |
| WO | WO2008/046937 | 4/2008 |
| WO | WO2008/098051 | 8/2008 |
| WO | WO2008/098055 | 8/2008 |
| WO | WO2008/100947 | 8/2008 |

* cited by examiner

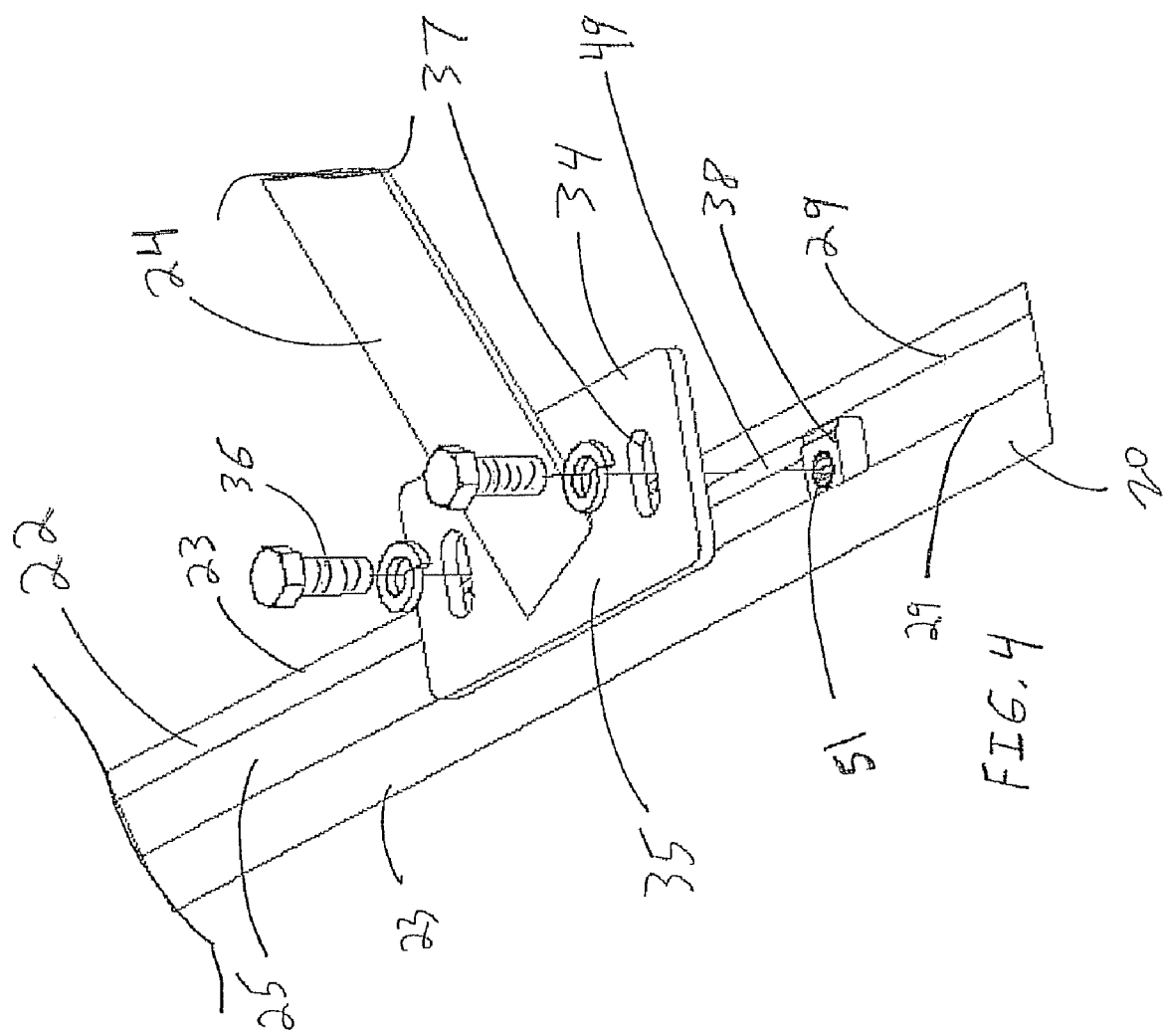

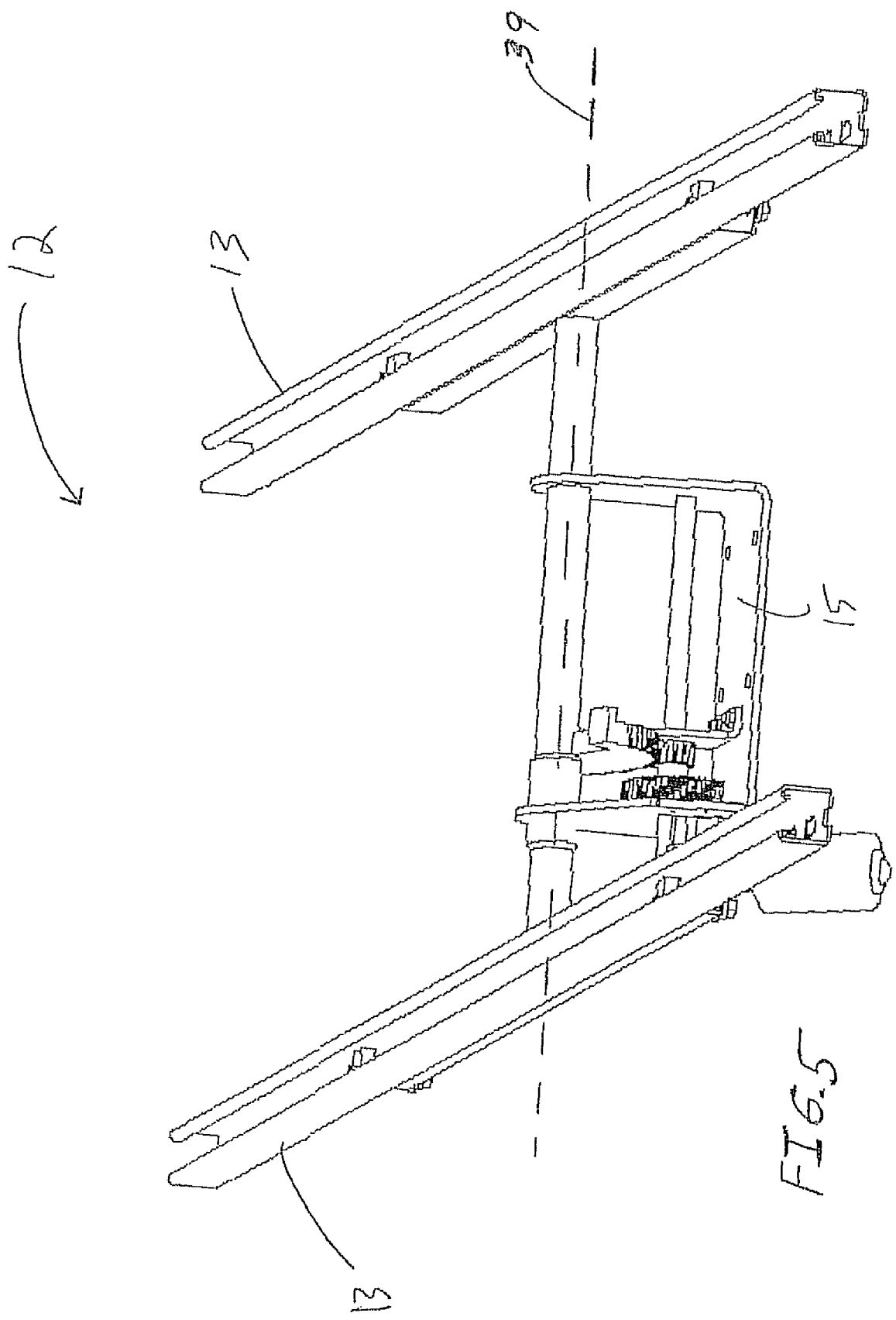

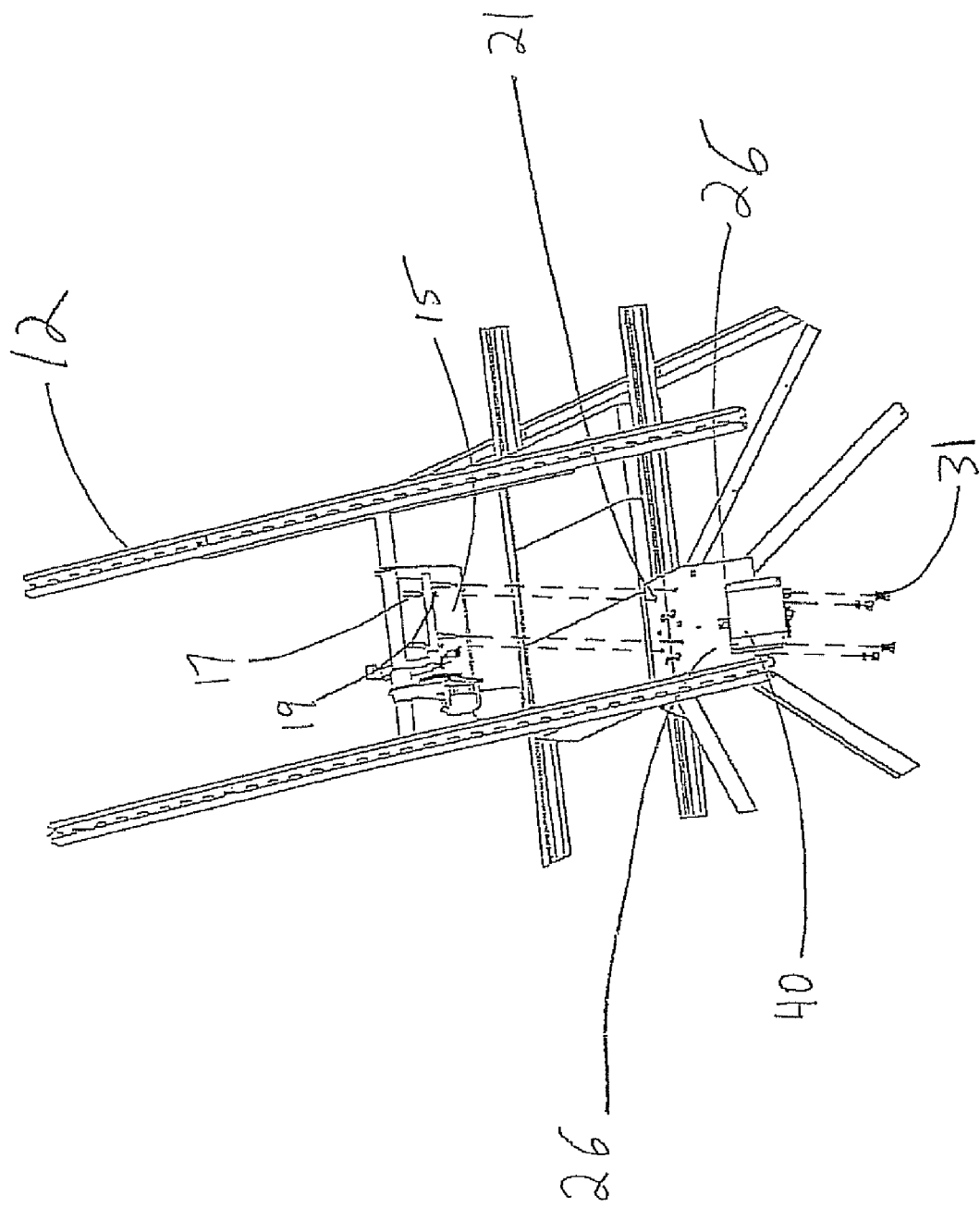

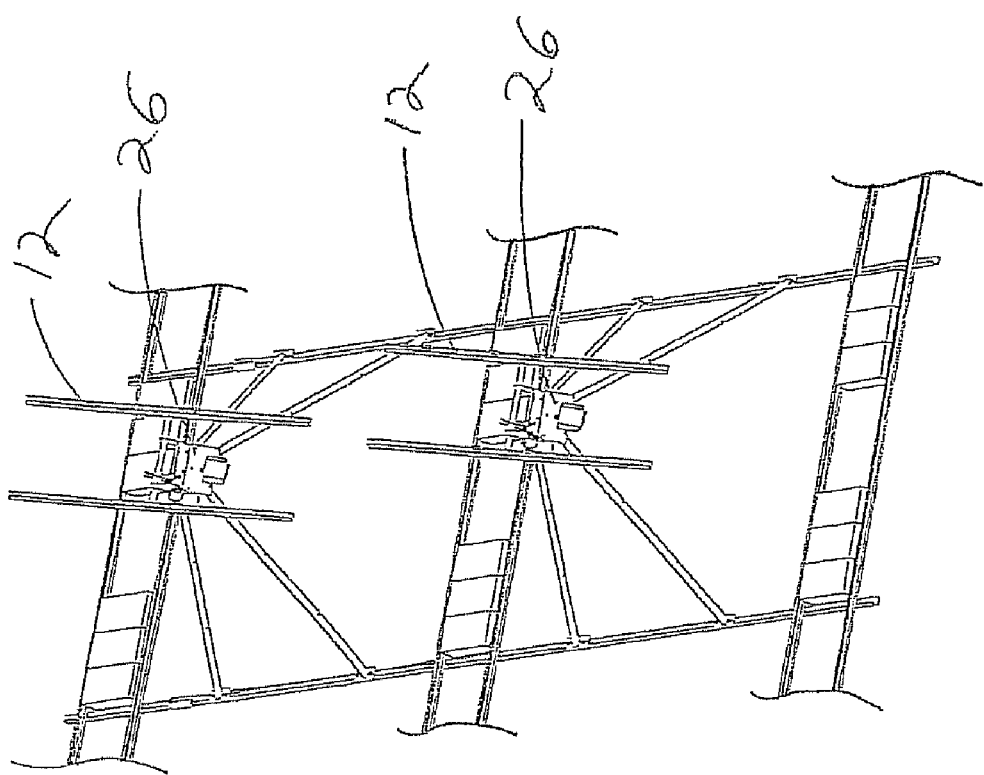

GRID SUPPORT SYSTEM FOR A TRACKER-MOUNTED SOLAR PANEL ARRAY FOR ROOFTOP APPLICATIONS

BACKGROUND OF THE INVENTION

1. Field of the Invention

This invention relates generally to the field of solar photovoltaic systems. More particularly, this invention relates to a support assembly for supporting a plurality of tracker-mounted solar panels for rooftop applications.

2. State of the Art

Terrestrial solar photovoltaic systems typically include one or more solar panels that convert solar insolation into electrical energy. Each solar panel is realized by one or more photovoltaic modules. The amount of electrical energy produced by a given solar panel is proportional to the intensity of the insolation that it receives as well as the surface area of the panel. One means of maximizing the amount of sunlight received by a solar panel is to use a tracker device that orients the solar panel in a controlled manner such that solar panel points toward the sun as the suns moves across the sky during the day. Maintaining the solar panel in a direction that points toward the sun allows for collection of the highest intensity of solar insolation available throughout the day. For rooftop applications, the tracker device(s) that support the solar panel(s) are generally mounted to posts (or other support structures) that penetrate the surface of the roof and are mechanically coupled to the structural frame of the building thereunder. Such roof penetration requires costly measures to seal the point of penetration and minimize the risk of leakage and often leads to difficulties and expense with regards to insuring against such leakage.

SUMMARY OF THE INVENTION

The present invention is directed to an assembly for supporting an array of tracker-mounted solar panels for rooftop applications. The assembly includes a base frame having a plurality of interconnected lateral members which define a generally planar area that lies substantially parallel with the rooftop of a building in use. A set of support legs are provided for each tracker device of the array. The support legs of a respective set are secured to the lateral members of the base frame and extend therefrom upward and inward toward one another to a tracker mount plate that supports the respective tracker device. In the preferred embodiment, each set of support legs includes four legs that extend upward and inward toward one another in a generally pyramidal shape. The tracker device supports one or more solar panels. Ballast trays are secured to the lateral members of the base frame and are adapted to hold ballast weight (preferably realized from cement cinder blocks or other dense heavy material) that applies a downward force on the lateral members of the base frame to stabilize and resist movement of the base frame. In the preferred embodiment, the ballast trays are secured to perimeter portion(s) of the planar area defined by such lateral members and possibly to other more central portion(s) of the planar area defined by the lateral members if needed.

It will be appreciated that the support structure provided by the ballast-weighted base frame and the tracker-mount support legs and solar panels connected thereto provide for effective distribution of and resistance to loading placed on the assembly by both the weight of the solar panels and the wind forces which act on the solar panels. The tracker-mount support legs also provide lateral stability to the respective solar panels mounted thereon in a position above the plane of the roof without interfering with movement of the solar panels.

In the preferred embodiment, each set of support legs includes two leg pairs that are secured to respective lateral members of the base frame that extend parallel to one another, and the tracker mounting plate supported by a corresponding set of support legs is realized by a two part design with two symmetrical parts, each including a side section angled relative to a top section. The top sections of the two parts are disposed opposite one another about a central axis therebetween. The adjacent top sections generally form a flat surface for mounting a tracker device thereto (preferably by bolts or other suitable mechanical fixation means). The side section of one part is secured to two of the four support legs (preferably by welding or bolts or other suitable mechanical means). The side section of the other part is secured to the other two of the four support legs (preferably by welding or bolts, other suitable mechanical means). In the preferred embodiment, the legs extend downward from a respective side section at a direction that corresponds to the angle of the side section relative to the top section. In this configuration, the desired mounting angle of the support legs is dictated by the angle of the side section relative to the top section for the mounting plate parts.

Leg attachment means is preferably provided for attaching the support legs to the lateral members of the base frame in a manner that is secure and easy to use as well as accommodating to minor variations in length of the support legs and in angle of the support legs relative to the tracker mounting plate. In the preferred embodiment, such leg attachment means is provided by guide channels that are defined by the lateral members that connect to a support leg. The guide channels are adapted to receive a connector that is slidably retained therein. The connector provides for bolt-on connection to a support leg in a manner that fixes the position of the connector and support leg in the guide channel, thereby securing the support leg to the lateral member in a fixed position. In the preferred embodiment, the guide channel of a respective lateral member is realized by oppositely disposed sidewalls with oppositely disposed lips that project therefrom to thereby form a slot accessible from the top of the lateral member. The connector has a threaded through-hole for receiving a threaded bolt. The connector is placed in the guide channel under the lip. A bolt (preferably with a locking washer) is inserted through the slot of a mounting flange of the support leg. The bolt extends through the slot of a mounting flange and through the slot of the lateral member for threaded connection to the through-hole of the connector. When the bolt is tightened, the connector grips the bottom side of the lip of the guide channel, thus fixing the position of the connector (as well as the support leg to which it is attached) to the lateral member of the base frame.

Additional objects and advantages of the invention will become apparent to those skilled in the art upon reference to the detailed description taken in conjunction with the provided figures.

BRIEF DESCRIPTION OF THE DRAWINGS

FIG. 4 is an enlarged view of leg attachment means for securing the support legs to the base frame in accordance with the present invention.

FIG. 5 is an enlarged view of an exemplary tracker device for use in the system of FIG. 1.

FIG. 6A is a view of the means for attaching the tracker device of FIG. 5 to the mounting plate of the support system of FIG. 1 in accordance with the present invention.

FIG. 6B is a view of two tracker devices attached to respective mounting plates of the support system of FIG. 1 in accordance with the present invention.

DETAILED DESCRIPTION OF THE PREFERRED EMBODIMENTS

Figure 1:
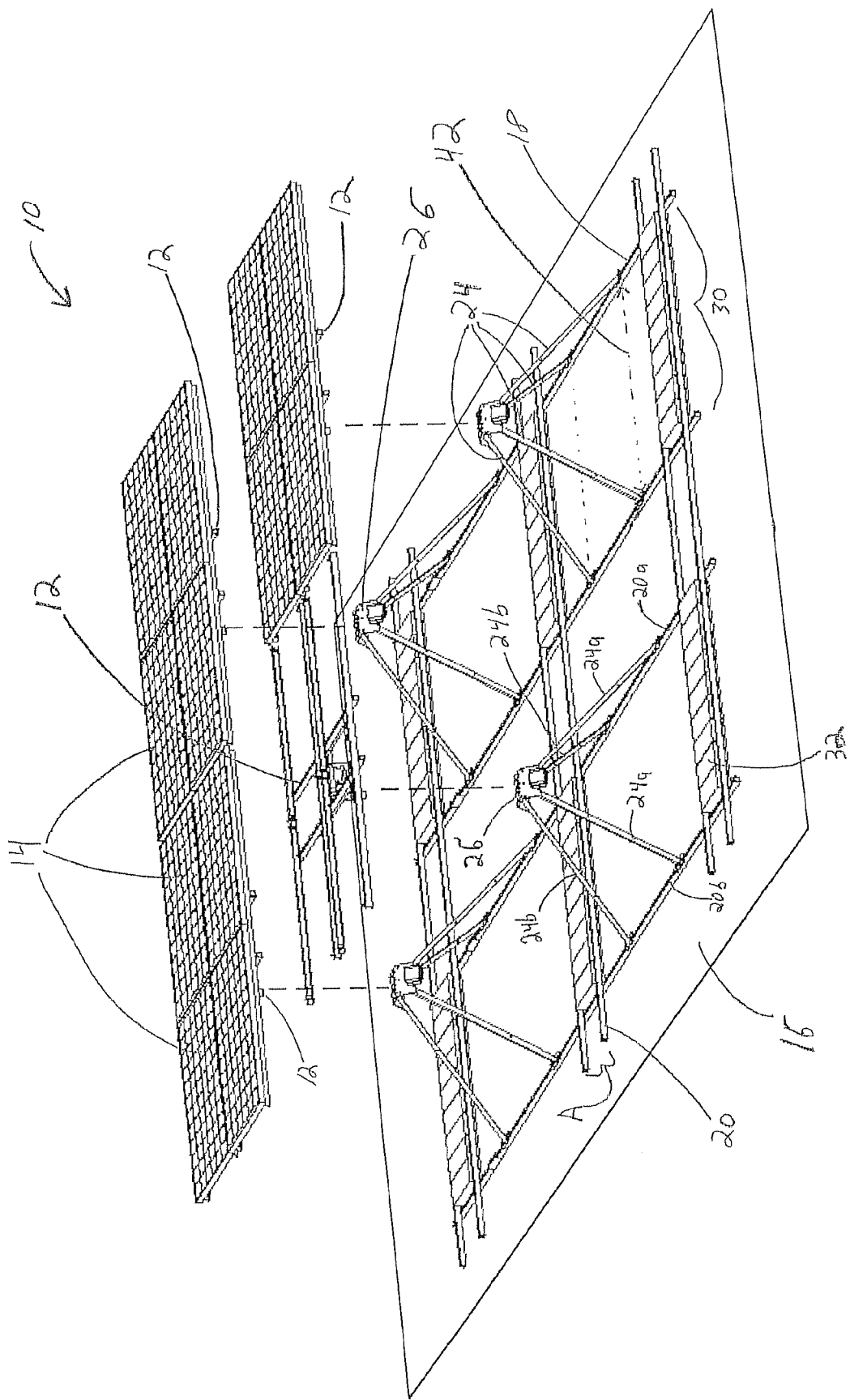
FIG. 1 is a view of a grid support system for a tracker-mounted solar panel array for rooftop applications in accordance with the present invention.

Referring to FIG. 1, an assembly 10 is provided for supporting an array of tracker devices 12 and tracker-mounted solar panels 14 on a rooftop 16. The assembly 10 includes a base frame 18 having a plurality of interconnected lateral members 20 which define a generally planar area substantially parallel with the rooftop 16. Sets of four support legs 24 are secured to the lateral members 20 and extend upward and inward toward one another to a tracker mounting plate 26 that supports a respective tracker device 12. The tracker device 12 supports one or more solar panels 14. Each solar panel 14 can be realized by one or more non-concentrating photovoltaic modules or concentrating photovoltaic modules. The photovoltaic modules can include silicon photovoltaic cells, thin-film photovoltaic cells, gallium arsenide (or other compound semiconductor) photovoltaic cells, or other suitable photovoltaic technology.

Figure 2:
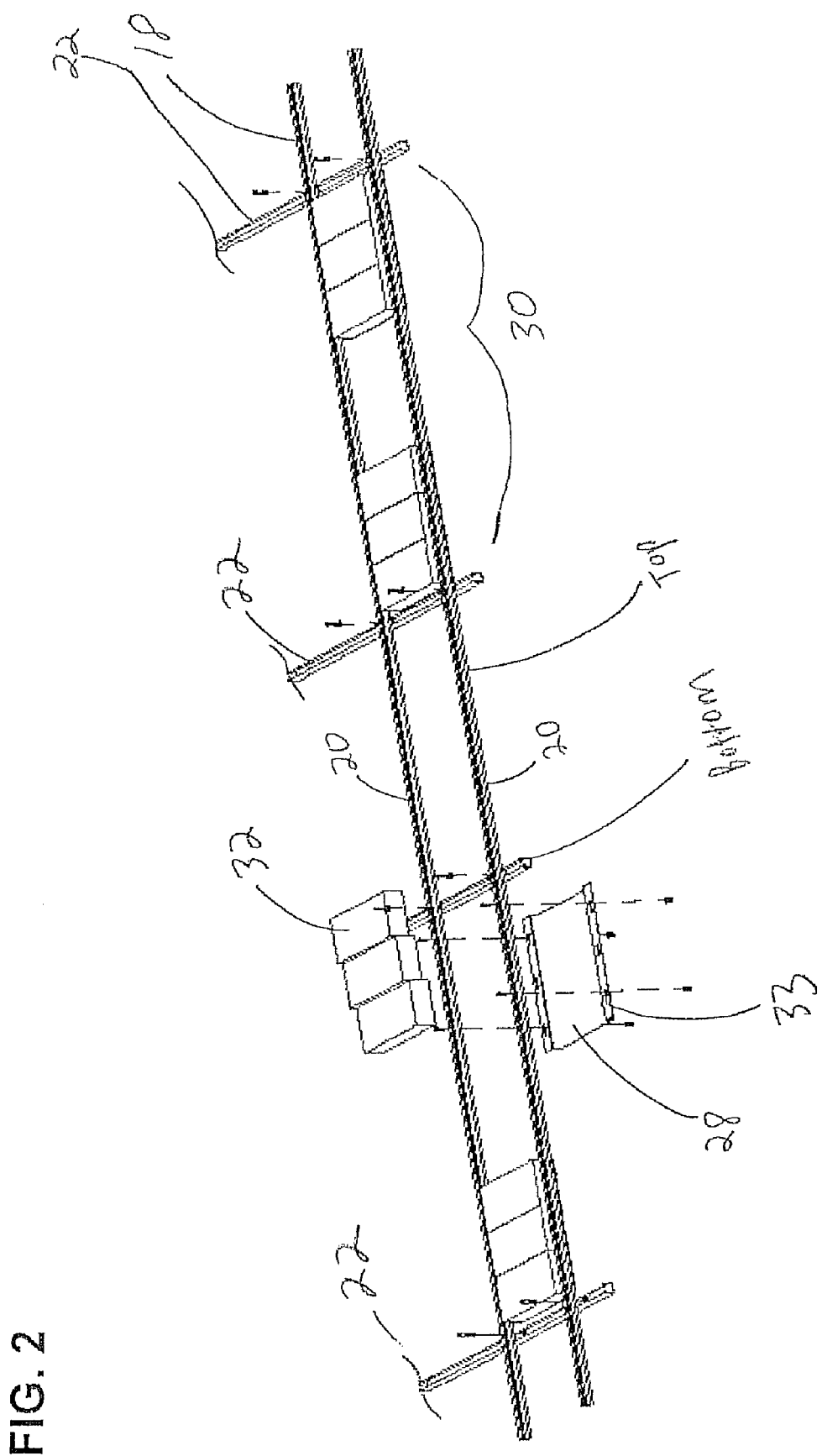
FIG. 2 is an exploded partial view of the system of FIG. 1, showing a ballast tray and ballast materials at perimeter portions of the base frame of the system in accordance with the present invention.

In the illustrative embodiment, the four support legs 24 of a respective set extend upward and inward toward one another in a generally pyramidal shape. Ballast trays 28 are secured to the lateral members 20 of the base frame 18 along perimeter portions 30 of the planar area defined by the lateral members 20 and possibly to other more central portion(s) of the planar area defined by the lateral members 20 as shown in FIGS. 1 and 2. The ballast trays 28 each hold a one or more ballast weights 32 for applying a downward force on the base frame 18 to further stabilize and resist movement of the base frame 18.

It will be appreciated that the support structure provided by the ballast-weighted base frame 18, support legs 24, and mounting plates 26 connected thereto provide for effective support of the tracker devices 12 and associated solar panels 14, as well as distribution of and resistance to loading placed on the assembly 10 by both the weight of the solar panels 14 and the wind forces which act on the solar panels 14. The support legs 24 also provide lateral stability to the respective solar panels 14 without interfering with movement of the solar panels 14. It will also be appreciated that the support assembly 10 allows the tracker devices 12 to rotate the solar panels 14 along one or more axes of rotation. In the preferred embodiment, each respective tracker device 12 rotates the solar panel(s) 14 supported thereon though a single axis of rotation that is generally perpendicular to the lateral members 20 which are connected to the support legs 24 of the respective tracker device. In this configuration, the solar panels 14 rotate about an arc from a first position generally parallel with one side section 41a of the tracker mounting plate 26 to a second position generally parallel with the other side section 43a of the tracker mounting plate 26 as discussed further below.

Figure 3:
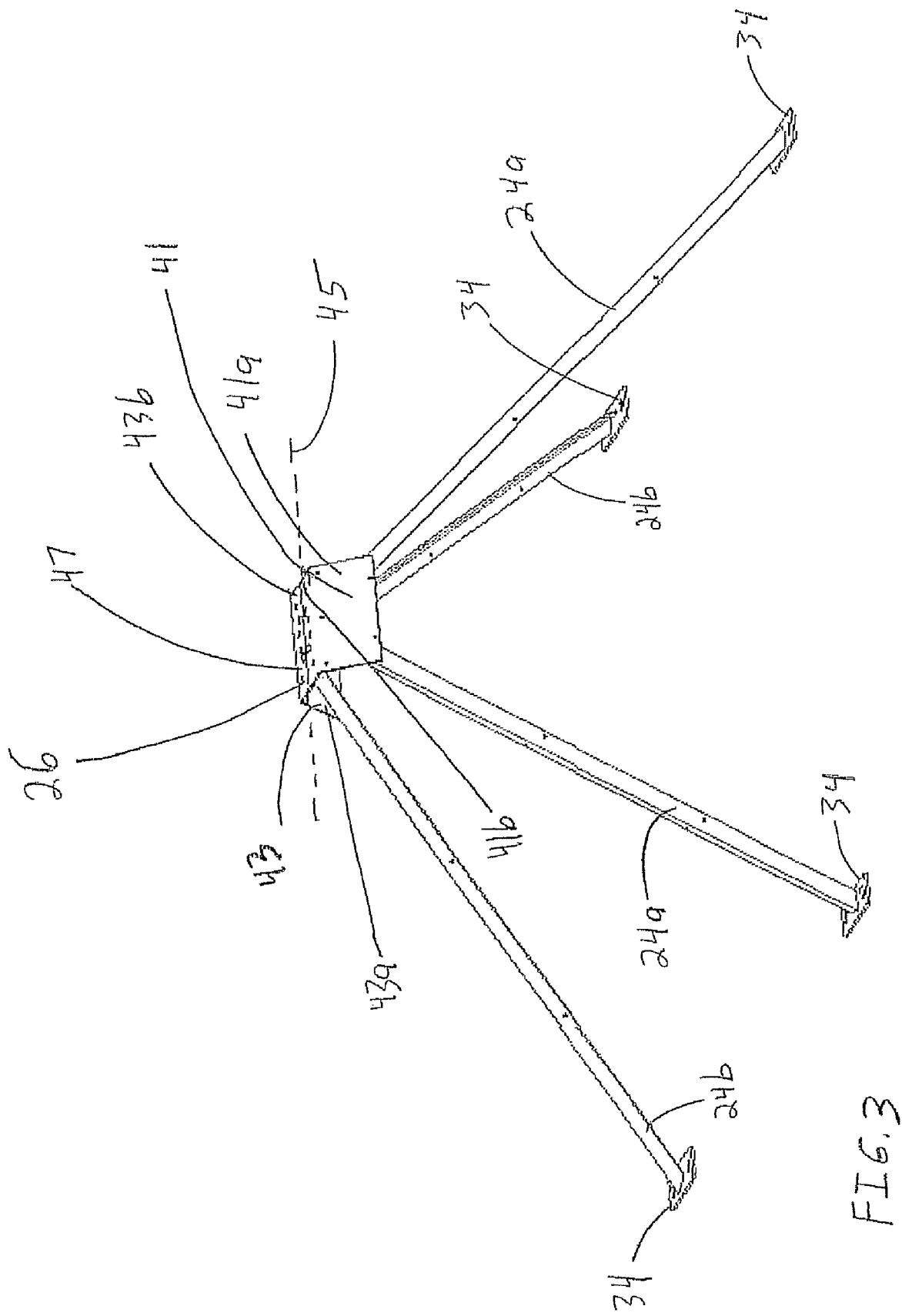
FIG. 3 is an enlarged view of a set of support legs attached to a corresponding tracker mounting plate of the support assembly of FIG. 1 in accordance with the present invention.

In the preferred embodiment as best shown with reference to FIGS. 1-4, each set of support legs 24 includes two front legs 24a and two rear legs 24b extending upward from parallel lateral members 20a, 20b and toward one another to a respective tracker mounting plate 26. The tracker mounting plate 26 is realized from a two part design with two symmetrical parts 41, 43 having side sections 41a, 43a angled relative to top sections 41b, 43b (FIG. 2). The top sections 41b, 43b of the two parts 41, 43 are disposed opposite one another about a central axis 45 therebetween. The adjacent top sections 41b, 43b generally form a flat surface 47 for mounting a tracker device 12 thereto preferably by bolts or other suitable mechanical fixation means. The side section 41a of one part 41 is secured to two of the four support legs (labeled 24a) preferably by welding or bolts or other suitable mechanical means. The side section 43a of the other part 43 is secured to the other two of the four support legs (labeled 24b) preferably by welding or bolts or other suitable mechanical means. In the preferred embodiment, the support leg pairs 24a, 24b extend downward from the respective side sections 41a, 43a in a direction that corresponds to the angle of the side sections 41a, 43a relative to the top sections 41b, 43b. In this configuration, the desired mounting angle of the support leg pairs 24a, 24b is dictated by the angle of the side sections 41a, 43a relative to the top sections 41b, 43b of the two parts 41, 43 of the mounting plate 26. The flat surface 47 of the respective mounting plates 26 of the assembly 10 are preferably disposed parallel with the roof 16 and include means for mounting a corresponding tracker device 12 thereto as further discussed below with respect to FIGS. 6A-6B. In an alternate embodiment, the tracker mounting plates of the assembly 19 may be formed from unitary element that is formed with two side sections and a top section to thereby realize a saddle shape similar to the two-part design as best shown in FIG. 3.

Turning to FIG. 4, the assembly 10 preferably employs leg attachment means for securing the support legs 24 to the lateral members 20 of the base frame 18 in a manner that allows for slidable movement of a respective support leg 24 along a length of a lateral member 20 as well as fixation of the support leg 24 to the lateral member 20 at a desired position along the lateral member 20. In the preferred embodiment, such leg attachment means is provided by guide channels 25 that are defined by the lateral members 20 that connect to a support leg 24. The guide channels 25 are adapted to receive a connector 38 that is slidably retained therein. The connector 38 provides for bolt-on connection to a support leg 24 in a manner that allows for slidable movement of a respective support leg 24 along a length of a lateral member 20. When the bolt connection between the connector 38 and the support leg 24 is tightened, the position of the connector 38 in the guide channel 25 is fixed, thereby securing the support leg 24 to the lateral member 20 in a fixed position. In the preferred embodiment, the guide channel 25 of a respective lateral member 20 is realized by oppositely disposed sidewalls 23 with oppositely disposed lips 29 that project therefrom to thereby form a slot 49 accessible from the top of the lateral member 20. The connector 38 has a threaded through-hole 51 for receiving a threaded bolt 36. The connector 38 is placed in the guide channel 25 under the lips 29. The threaded bolt 36 (preferably with a locking washer) is inserted through the slot 49 of a mounting flange 34 of the support leg 24. The mounting flange 34 may be secured to the support leg 24 by welding or bolts or other suitable mechanical means. The bolt 36 extends through a slot 37 in the mounting flange 34 and through the slot 49 of the lateral member 20 for threaded connection to the through-hole 51 of the connector 38. When the bolt 36 is tightened, the connector 38 grips the bottom side of the lips 29 of the guide channel 25, thus fixing in position the connector 38 (as well as the support leg to which it is attached) to the lateral member 20 of the base frame 18. Such leg attachment means allows for easy connection of the support legs 24 to the lateral members 20, and accommodates various changes to the dimensions of the assembly 10, such as, for example, the length of the support arms 24, the offset distance between two parallel lateral members (20*a*, 20*b*), the size of the mounting plate 26, the clearance needed for a given solar panel 14, manufacturing tolerances etc. As the guide channel 25 preferably extends through the length of the lateral member 20, the support legs 24 can be attached at different positions along the lateral member 20 depending upon the parameters of a particular rooftop and/or application. In addition, during assembly, the bolts 36 can be loosened and the flange 34 and corresponding support leg 24 slid along the guide channel 25 to the desired location. It is preferred, however, that the dimensions of the support legs 24 and mounting plates 26, as well as the offset distances between the lateral members 22 be generally uniform to allow for the symmetrical structure of the assembly 10 shown in FIG. 1, and to ensure the pyramidal shape defined by each set of support legs 24 shown in FIG. 1.

The lateral members 20 are preferably arranged in a grid-like manner as shown in FIG. 1 with a number of the lateral members 20 extending perpendicular to and lying on top of other of the lateral members 20 and arranged in parallel. The top and bottom lateral members 20 are preferably connected by bolts or other fasteners as shown in FIG. 2. Using bolts or similar fasteners allows for easier assembly or disassembly of the base frame 18, but welding or other equivalent means may alternatively or additionally be used. As shown in FIGS. 1 and 2, the top lateral members 20 are preferably arranged in pairs with the ballast trays 28 attached to the paired lateral members 20 underneath the paired lateral members 20 along the perimeter portions 30. Ballast trays 28 and ballast materials 32 may also be placed along a pair of lateral members 20 extending across the generally planar area between particular tracker mounts as shown in FIG. 1.

As shown in FIG. 2, the ballast trays 28 preferably contain upper flanges 33 which may be bolted to the underside of the lateral members 20 such that the ballast trays 28 are disposed underneath the lateral members 20 as shown in FIG. 2. The upper flanges 33 of the ballast trays 28 are preferably dimensioned to allow the bottom surface of the ballast trays 28 to contact and rest on the roof 16 when the trays 28 are bolted under the lateral members 20. Allowing the weighted trays 28 to rest on the roof 16 provides added frictional resistance to movement of the assembly 10 by wind or other loading. Depending upon the thickness of the bottom lateral members 20 (which effects the height of the top lateral members 20 relative to the roof 16), the ballast trays 28 may alternatively be suspended from the top lateral members 20 with their bottom surfaces above the roof 16.

Turning to FIG. 5, an enlarged view of an exemplary tracker device 12 is shown. The tracker device 12 has two arms 13 which mount to the solar panels 14 and a mounting section 15 which mounts to the flat surface 47 of the mounting plate 26 by bolts or other equivalent means. The tracker device 12 rotates the solar panels 14 about the axis 39 to move the solar panels 14 toward the sun's rays throughout the day. As discussed above, the range of motion of the solar panels 14 is preferably from a first position parallel with one side section 41*a* of the mounting plate 26, through an arc, to a second position parallel with the other of the side sections 43*a* of the mounting plate 26. It is anticipated that any single axis solar tracker known in the art may be used with the assembly 10 disclosed herein. Additionally, it is anticipated that dual axis solar trackers known in the art may also be used in conjunction with the assembly 10. FIGS. 6A-6B illustrate means for attaching the tracker device 12 of FIG. 5 to the mounting plate 26 of FIG. 3. Bolts 17 are extended through holes 19 in the mounting section 15 of the tracker device 12, and through holes 21 in the flat surface 47 of the mounting plate 26 to secure the tracker device 12 to the mounting plate 26. A controller 40 for controlling operation of the tracker device 12 as is well known in the art is preferably mounted to one of the side sections 41*a*, 43*a* of the mounting plate 26 via bolts 31 or other equivalent means. The controllers 40 of the array may interface to a master controller (not shown) to provide for control over all of the tracker devices 12 of the array.

It is anticipated that the dimensions of the support assembly 10, including, for example, the dimensions of the support legs 24 and the dimensions of the space defined by the lateral members 20 of the base frame 18 which surround a given tracker device 12, will be largely determined based upon the parameters of a particular application. Such parameters include, for example, the size of the roof, the number of tracker devices and solar panels to be used, the dimensions and weights of the tracker devices and solar panels, the desired range of motion of the solar trackers, the climate at a given location (winter climates may require a minimum roof clearance of 18" due to snow while warmer climates may allow for mounting of the panels 14 closer to the roof 16 with shorter support legs 24), and the estimated wind loading on the solar panels. By way of example, two pairs of parallel lateral members 20 on opposite sides of a tracker device 12 might together define a ten foot by ten foot square planar area under the given tracker device 12.

The materials used for the base frame 18 and ballast material 32 may also vary depending upon the parameters discussed above for a particular application. Galvanized steel coated for long life is recommended for the base frame 18 and mounting plates 26 for longevity and weight. While the use of steel increases the weight of the assembly 10, other lighter materials such as, for example, aluminum, may be used, which may require an increase in the amount and/or type of ballast material 32 attached to the base frame 18. It will be appreciated that additional and/or larger trays 28 may be added to the base frame 18 to provide additional ballast material 32 as needed.

Advantageously, the support legs 24 of the assembly 10 as well as grid-like base frame 18 distributes tensile and compressive forces applied to the support legs 24 to the interconnected lateral members 20 of the base frame 18. Such forces can result from the weight of the tracker devices 12, the solar panels 14, and the mounting plates 26 as well as the loading caused by rotation of the solar panels 14 and by wind loading on the solar panels 14. The support legs 24 of the assembly 10 also provide space for the range of motion of the solar panels 14. The ballast-weighted base frame 18 also stabilizes and resists movement of the base frame during loading conditions and avoids roof penetration, which thus minimizes the risk of leakage that stems from roof penetration and avoids the difficulties and expense with regards to insuring against such leakage.

There have been described and illustrated herein several embodiments of an assembly for supporting an array of tracker devices and tracker-mounted solar panels for rooftop applications. While particular embodiments of the invention have been described, it is not intended that the invention be limited thereto, as it is intended that the invention be as broad in scope as the art will allow and that the specification be read likewise. Thus, while particular materials, dimensions, and offset distances have been disclosed, it will be appreciated that other suitable materials, dimensions, and offset distances can be used as well. While the embodiment of the present invention discloses the support assembly on a generally horizontal roof, it will be appreciated by those skilled in the art that the support assembly may also be used on a roof having a small incline (e.g. less than a five inch pitch) provided that sufficient ballasting material is used. In addition, while a single axis tracker device with associated solar panels has been disclosed as being suitable for the support assembly, it will be appreciated that other types of tracker devices, including dual axis tracker devices, may be used. Moreover, it will be appreciated that the dimensions and offset distances of the assembly may be varied to accommodate such other types of tracker devices and solar panels. Additionally, it will be appreciated that while a base frame is disclosed having a number of interconnected lateral members which extend in parallel and perpendicular directions relative to teach other, other configurations may be used in which the lateral members lie in other directions. It will be appreciated by those skilled in the art that these and other modifications could be made to the provided invention without deviating from its spirit and scope as claimed.

What is claimed is:

1. In a terrestrial photovoltaic system including a plurality of tracker devices each supporting at least one solar panel on a rooftop, the tracker devices for adjusting orientation of the at least one solar panel supported thereon, an apparatus for supporting the plurality of tracker devices and associated solar panels in conjunction with a plurality of ballast weights, the apparatus comprising:
a base frame including a plurality of interconnected lateral members which define a generally planar area that is substantially parallel with the rooftop and disposed under the plurality of tracker devices and the solar panels supported thereon;
a plurality of support structures mounted to said base frame and arranged in a rectangular array, wherein each support structure corresponds to a respective tracker device of the plurality of tracker devices and includes a set of support legs mounted to said lateral members of said base frame and extending upward and inward toward one another to a tracker mounting plate, said tracker mounting plate disposed below a corresponding tracker device and supporting the corresponding tracker device and at least one solar panel secured thereto, and wherein each given support leg is secured to a respective lateral member with a connector that provides for fixation of the given support leg relative the respective lateral member at different positions along the length of the respective lateral member; and
a plurality of ballast trays, separate and distinct from the plurality of ballast weights, attached to said base frame and adapted to hold the plurality of ballast weights for applying a downward force on said base frame to stabilize and resist movement of said base frame, wherein said ballast trays are attached to said base frame along at least a perimeter portion of said generally planar area defined by said base frame.

2. An apparatus according to claim 1, wherein:
said set of support legs includes four legs that define a generally pyramidal shape.

3. An apparatus according to claim 1, wherein:
said lateral members of said base frame which connect to said set of support legs are substantially parallel relative to each other.

4. An apparatus according to claim 1, wherein:
said lateral members of said base frame are arranged in a rectangular grid including a first set of said lateral members that extend in a parallel direction relative to each other and a second set of lateral members that extend in a perpendicular direction relative to said first set of lateral members.

5. An apparatus according to claim 1, wherein:
the connector that secures the given support leg to the respective lateral member is moveable along a channel defined over the length of the respective lateral member.

6. An apparatus according to claim 5, wherein:
the channel is defined by oppositely disposed sidewalls with oppositely disposed lips projecting from said sidewalls;
the connector is retained inside the channel below the lips and moveable within the channel; and
the given support leg is secured to the respective lateral member by a flange mounted to said given support leg with a through-opening to allow for bolt-on connection thereto, and at least one bolt that extends through said through-opening of said flange into said channel of the respective lateral member to mate with said connector, whereby said connector grips bottom sides of the lips of the respective lateral member to fixably secure the given support leg to the respective lateral member.

7. An apparatus according to claim 1, wherein:
each of said tracker mounting plates has two parts, each of said parts having a top section and a side section extending at an angle from said top section, wherein a first plurality of support legs of a given set are secured to said side section of one of said two parts of a corresponding mounting plate, and a second plurality of support legs of a given set are secured to said side section of the other of said two parts, said top sections of said corresponding mounting plate forming a generally planar mounting surface.

8. An apparatus according to claim 7, wherein:
said two parts of each mounting plate are symmetrical and lie opposite each other.

9. An apparatus according to claim 1, wherein:
each ballast tray has a generally planar bottom surface disposed opposite a generally planar top surface, said bottom surface oriented downward and facing said rooftop, and said top surface oriented upward and supporting at least one ballast weight resting thereon during use.

10. An apparatus according to claim 9, wherein:
said bottom surface of each respective ballast tray contacts the rooftop.

11. An apparatus according to claim 9, wherein:
said bottom surface of each respective ballast tray is suspended above the rooftop.

12. An apparatus according to claim 9, wherein:
each respective ballast tray extends between and is supported by a pair of lateral members of the base frame that extend parallel to one another.

13. A terrestrial photovoltaic system for use on a rooftop in conjunction with a plurality of ballast weights, the terrestrial photovoltaic system comprising:
a plurality of solar panels;
a plurality of tracker devices each supporting at least one of said plurality of solar panels, said tracker devices for adjusting orientation of the at least one solar panel supported thereon;
a base frame including a plurality of interconnected lateral members which define a generally planar area that is substantially parallel with the rooftop and disposed under the plurality of tracker devices and the solar panels supported thereon;

a plurality of support structures mounted said to base frame and arranged in a rectangular array, wherein each support structure corresponds to a respective tracker device of the plurality of tracker devices and includes a set of support legs secured to said lateral members of said base frame and extending upward and inward toward one another to a tracker mounting plate, said tracker mounting plate disposed below a corresponding tracker device and supporting the corresponding tracker device and at least one solar panel secured thereto, and wherein each given support leg is secured to a respective lateral member with a connector that provides for fixation of the given support leg relative the respective lateral member at different positions along the length of the respective lateral member; and a plurality of ballast trays, separate and distinct from the plurality of ballast weights, attached to said base frame and holding the plurality of ballast weights for applying a downward force on said base frame to stabilize and resist movement of said base frame, wherein said ballast trays are attached to said base frame along at least a perimeter portion of said generally planar area defined by said base frame.

14. A terrestrial photovoltaic system according to claim 13, wherein:
said set of support legs includes four legs that define a generally pyramidal shape.

15. A terrestrial photovoltaic system according to claim 13, wherein:
said lateral members of said base frame which connect to said set of support legs are substantially parallel relative to each other.

16. A terrestrial photovoltaic system according to claim 13, wherein:
said lateral members of said base frame are arranged in a rectangular grid including a first set of said lateral members that extend in a parallel direction relative to each other and a second set of lateral members that extend in a perpendicular direction relative to said first set of lateral members.

17. A terrestrial photovoltaic system according to claim 13, wherein:
the connector that secures the given support leg to the respective lateral member is moveable along a channel defined over the length of the respective lateral member.

18. A terrestrial photovoltaic system according to claim 17, wherein:
the channel is defined by oppositely disposed sidewalls with oppositely disposed lips projecting from said sidewalls;
the connector is retained inside the channel below the lips and moveable within the channel; and
the given support leg is secured to the respective lateral member by a flange mounted to said given support leg with a through-opening to allow for bolt-on connection thereto, and at least one bolt that extends through said through-opening of said flange into said guide channel of the respective lateral member to mate with said connector, whereby said connector grips bottom sides of the lips of the respective lateral member to fixably secure the given support leg to the respective lateral member.

19. A terrestrial photovoltaic system according to claim 11, wherein:
each of said tracker mounting plates has two parts, each of said parts having a top section and a side section extending at an angle from said top section, wherein a first plurality of support legs of a given set are secured to said side section of one of said two parts of a corresponding mounting plate, and a second plurality of support legs of a given set are secured to said side section of the other of said two parts, said top sections of said corresponding mounting plate forming a generally planar mounting surface.

20. A terrestrial photovoltaic system according to claim 19, wherein:
said two parts of each mounting plate are symmetrical and lie opposite each other.

21. A terrestrial photovoltaic system according to claim 13, wherein:
each ballast tray has a generally planar bottom surface disposed opposite a generally planar top surface, said bottom surface oriented downward and facing said rooftop, and said top surface oriented upward and supporting at least one ballast weight resting thereon during use.

22. A terrestrial photovoltaic system according to claim 21, wherein:
said bottom surface of each respective ballast tray contacts the rooftop.

23. A terrestrial photovoltaic system according to claim 21, wherein:
said bottom surface of each respective ballast tray is suspended above the rooftop.

24. A terrestrial photovoltaic system according to claim 21, wherein:
each respective ballast tray extends between and is supported by a pair of lateral members of the base frame that extend parallel to one another.

* * * * *